L. ARKIN.
FASTENER.
APPLICATION FILED JULY 21, 1919.

1,402,827.

Patented Jan. 10, 1922.

Inventor
Louis Arkin
by Robert Robert Cushman
his Attorneys

UNITED STATES PATENT OFFICE.

LOUIS ARKIN, OF BOSTON, MASSACHUSETTS.

FASTENER.

1,402,827.

Specification of Letters Patent. Patented Jan. 10, 1922.

Application filed July 21, 1919. Serial No. 312,113.

*To all whom it may concern:*

Be it known that I, LOUIS ARKIN, a citizen of the United States, and resident of Boston, in the county of Suffolk and State of Massachusetts, have invented new and useful Improvements in Fasteners, of which the following is a specification.

This invention relates to separable fasteners of the type described and claimed in Letters Patent of the United States No. 1,225,741, granted to me on May 15, 1917, which comprise essentially complemental stud and socket members, said socket member provided with stud retaining and releasing means and a resilient member adapted to be engaged and stressed by the insertion of the stud into the socket and to force the stud from the socket without manipulation of said stud.

More particularly the invention relates to the stud retaining and releasing means with which the socket is provided and its object is to provide very simple and efficient means for securely locking the stud within the socket under all usual conditions of service and at the same time insuring its ready release to permit the resilient member provided for that purpose to force it from the socket without manipulation of said stud.

Referring to the drawings which illustrate an embodiment of the invention,—

Figure 4:
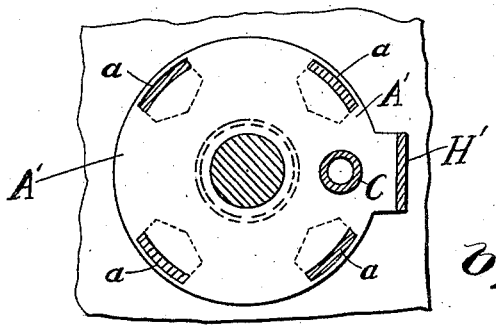
Figure 4 is a transverse section on the broken line 4—4 of Fig. 1.

The improved socket member comprises a dome or casing A of usual contour and a base plate $A^1$, the latter having the usual stud receiving aperture. Said casing and base plate are secured together by any usual means as by prongs $a$ fast on the casing, adapted to be passed through complemental slots in the base plate and thereafter to be turned over upon said plate as best shown in Fig. 4.

Figure 1:
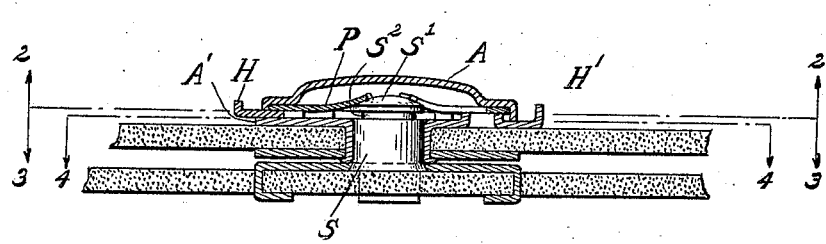
Figure 1 is a central longitudinal section of the fastener with the stud engaged in the socket.
Figure 3:
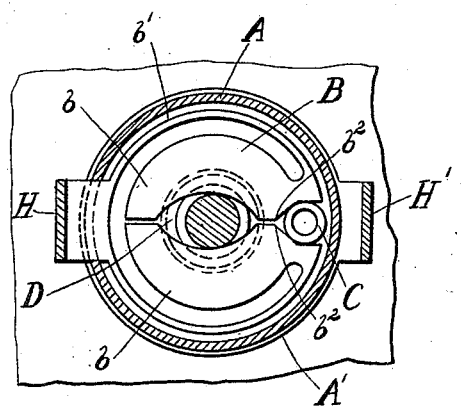
Figure 3 is a similar view viewed in the direction of the arrows 3—3 of Fig. 1.

Within said socket is a stud retainer B formed of a single sheet of metal and comprising a pair of stud retaining jaws $b$ formed integral with the opposite arms respectively of a flexible divided ring $b^1$ which encircles said jaws and is connected at its free ends with the adjacent ends of said jaws. Said jaws are so formed as to provide an oval stud aperture D located in the path of the stud S and into which it is adapted to enter upon its insertion into the casing A. An actuating member or handle H is fast on said ring $b^1$ and extends outside the casing A through slots provided for that purpose. A similar handle $H^1$, preferably formed integral with the base plate $A^1$, is disposed opposite said handle H. The stud retaining jaws $b$ are provided with inclined surfaces $b^2$ as clearly shown in Fig. 3, and said inclined surfaces are in movable engagement with a post or abutment C carried by the base plate $A^1$ and preferably formed integral therewith.

Figure 2:
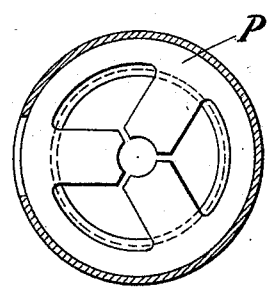
Figure 2 is a transverse section on the broken line in Fig. 1 viewed in the direction of the arrows 2—2.

Within the casing A and disposed above said stud retainer D, is a resilient member P, preferably a spring plate as best shown in Fig. 2, located in the path of the stud S and adapted to be engaged by said stud upon its insertion into the casing and to be stressed thereby. The stud S is of the form shown having an enlarged head $S^1$ and a neck or groove $S^2$, said head $S^1$ being of greater, and said groove portion $S^2$ of less, diameter, than any diameter of the stud aperture D.

In use, the stud S is inserted into the casing A through the stud receiving aperture and its head entering the stud aperture D, flexes and forces the retaining jaws $b$ apart and, passing through them, engages and stresses the resilient member P. When the stud head has thus passed therebetween the retaining jaws $b$ close around the neck or grooved portion $S^2$ of the stud so that the stud is thus firmly locked within said casing with the resilient member P stressed thereby.

To release the stud, the actuating member or handle H is pressed inward forcing the retainer B toward the abutment C thus causing the inclined surfaces $b^2$ of the jaws $b$ to move along the abutment C spreading said retaining jaws so that they move out of the stud groove $S^2$ thus releasing the stud and leaving its head free to pass out of the stud aperture D. When the stud is thus released, the resilient member P forces it free of the socket and, upon release of the handle H, the retaining jaws $b$ return to normal position.

A socket member constructed in accordance with my invention as above described, possesses marked simplicity of construction and, therefore, has the capacity for economic manufacture essential to the commercial success of devices of this character, which, as a practical matter, whatever may be their intrinsic merit, are commercially useless unless they can be sold at a comparatively low price. And this simplicity of parts is obtained without sacrifice of strength and durability and without eliminating any of the advantages inherent in fasteners of this type wherein the stud is forced from the socket without manipulation of said stud.

I claim:

1. A socket member of a fastener comprising a casing having a stud receiving aperture, a stud retainer within said casing comprising a pair of jaws provided with opposed arcuate gripping faces, a pair of resilient members fixedly secured to an end of the respective jaws, said jaws having oppositely inclined substantially flat surfaces adjacent their points of connection to said members, an abutment pin, a manually operable finger grip for moving said resilient members whereby to bring said inclined surfaces into contact with said pin and a fixed finger grip opposed to said movable grip.

2. A socket member of a fastener comprising a casing having a stud receiving aperture, a stud retainer within said casing comprising a pair of movable retaining jaws having oppositely disposed, concave gripping edges providing an axial stud-receiving opening and having substantially straight inclined surfaces in continuation of said edges and a divided flexible ring surrounding said jaws and fast at its free ends thereto, an actuating member fast on said ring and extending outside said casing, and a circular abutment fixedly mounted in said casing, said inclined surfaces being engageable with said abutment whereby upon inward movement of said actuating member said jaws are flexed to release the stud.

3. A socket member of a fastener comprising a casing having a stud receiving aperture, a stud retainer within said casing comprising a pair of retaining jaws fast to the respective arms of a divided ring surrounding said jaws, said jaws having opposed concave gripping faces and being provided with inclined surfaces adjacent their connection to said arms, an actuating member fast to said ring and extending outside said casing, an abutment fixedly mounted in said casing, and having a curved surface, said inclined surfaces being engageable with the curved surface of said abutment, whereby upon inward movement of said actuating member said jaws are moved to release the stud, and a resilient member disposed above said retaining jaws adapted to be engaged and stressed by the insertion of the stud into the socket whereby to force the stud from the socket without manipulation of said stud.

Signed by me at Boston, Massachusetts, this 18th day of July, 1919.

LOUIS ARKIN.